Figure 1:
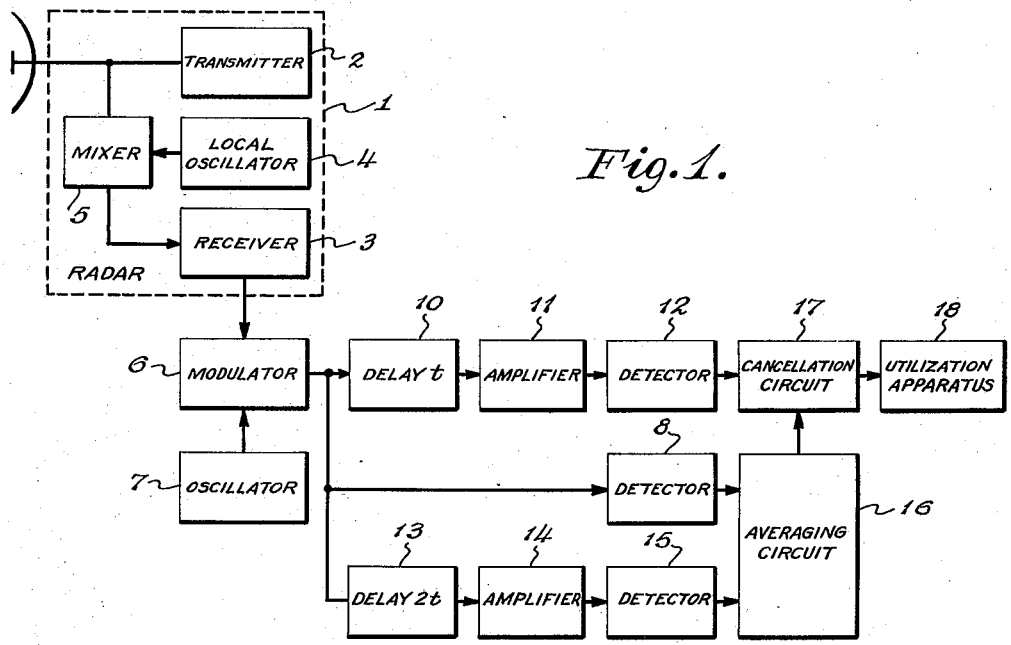

July 8, 1958 J. W. DOWNS 2,842,761
MOVING TARGET INDICATOR RADAR SYSTEM
Filed Jan. 12, 1953 5 Sheets-Sheet 1

INVENTOR
JOHN W. DOWNS
BY
ATTORNEY

July 8, 1958  J. W. DOWNS  2,842,761
MOVING TARGET INDICATOR RADAR SYSTEM
Filed Jan. 12, 1953  5 Sheets-Sheet 3

INVENTOR
JOHN W. DOWNS
BY
ATTORNEY

Fig. 7.
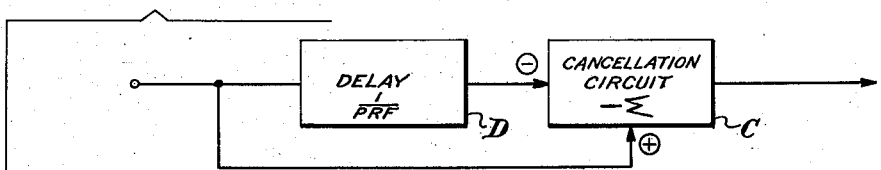
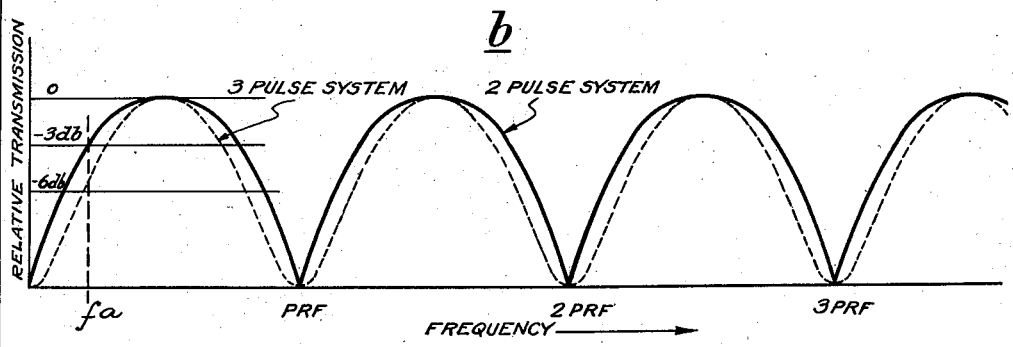
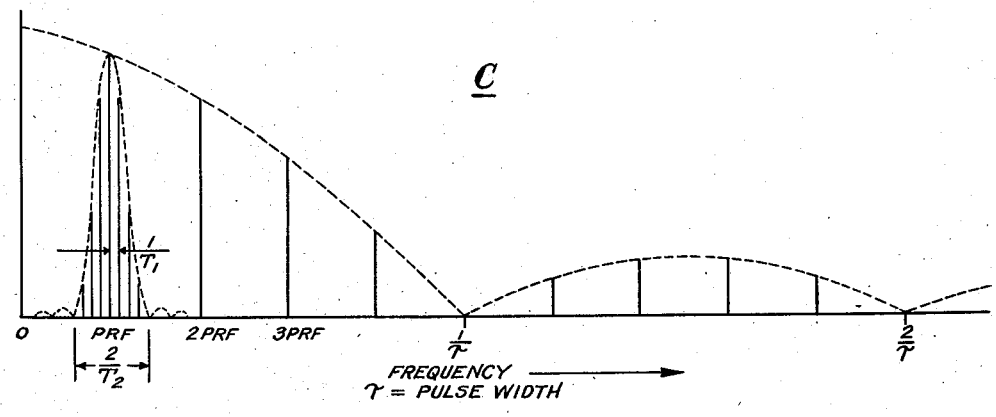
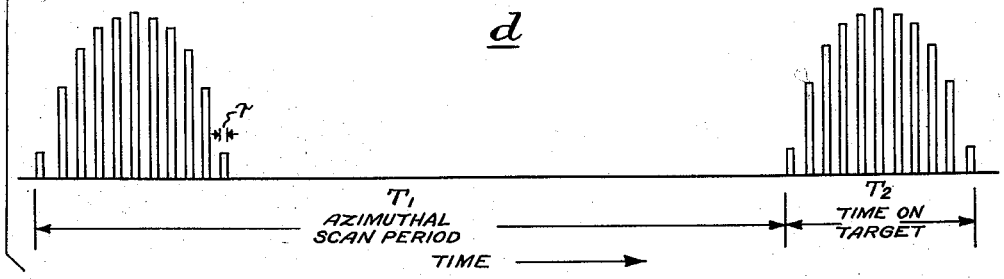

United States Patent Office 2,842,761
Patented July 8, 1958

2,842,761

MOVING TARGET INDICATOR RADAR SYSTEM

John W. Downs, Glen Cove, N. Y., assignor to Sperry Rand Corporation, a corporation of Delaware Application January 12, 1953, Serial No. 330,660

18 Claims. (Cl. 343—7.7)

This invention relates to moving target indicator radar systems, and more particularly, to a combined moving target indicator and signal integrating system adapted to be used with search radars.

Modern design of radar systems has been directed towards eliminating ground clutter and improving detectable range. Ground clutter is caused by large objects such as land masses which return large signals and mask small targets such as aircraft. This effect is limited to the ground return portion of the pulse cycle, for instance from 0 to 60 or 70 miles. An interesting discussion of conventional moving target indicators is given in volume I of the Radiation Laboratory Series, published by McGraw-Hill, beginning at page 626. An objective is to improve useful radar range which is generally limited by received noise. It may be extended by improving the signal-to-noise ratio by correlating the regularly received signals from the random noise by a process of integration.

The present invention provides a combined moving target indicator (M. T. I.) and integration system having two modes of operation. The M. T. I. mode operates during the first portion of the pulse cycle during the time when ground clutter is received, and the integration mode operates during the remainder of the cycle.

The M. T. I. portion of the present system is a three-pulse comparison system which compares a received signal with the average of the preceding and succeeding signals. The three-pulse system has been found to provide a significant improvement over conventional two-pulse comparison systems. A single delay line is used to provide the 1 cycle and 2 cycle delays, and a modulation system is provided to recirculate the signals through the single delay line. During the second portion of the pulse cycle, the system is switched to the integration mode of operation and utilizes the same delay line to integrate or add delayed and undelayed versions of received signals. Suitable time sharing gating means are provided to switch between the two modes of operation. The present invention may be packaged as a kit for connection to conventional pulse radars.

Accordingly, a principal object of the invention is to provide a new and improved moving target indicator (M. T. I.) system for radar.

Another object of the invention is to provide a combined moving target indicator and integrating radar system.

Another object of the invention is to provide a combined moving target indicator and integrating kit for existing radars.

Another object of the invention is to provide means to minimize ground clutter.

Another object of the invention is to provide means to improve radar range.

Another object of the invention is to provide means to minimize ground clutter and improve radar range.

Another object of the invention is to provide combined means to minimize ground clutter during a first portion of the pulse cycle and to integrate received signals during the second portion of the pulse cycle.

Another object of the invention is to provide moving target indicator means comprising means to compare a received signal with the average of the preceding and succeeding signals.

Another object of the invention is to provide a moving target indicator comprising a delay line, means to delay received signals one or more cycles through the delay line, and means to subtract delayed and undelayed signals.

Another object of the invention is to provide a system having an M. T. I. mode and an integrating mode of operation.

Another object of the invention is to provide a moving target indicator comprising a delay line, means to delay received signals 1 and 2 cycles through the delay line, means to subtract delayed and undelayed signals, and means to integrate received signals with said delay line.

Another object of the invention is to provide a combined moving target indicator and integrator system using only a single delay line.

Another object of the invention is to provide a combined moving target indicator and integrator system using a single delay line, modulating means to recirculate received signals through the delay line at least twice during a first portion of the radar cycle, and switching means arranged to utilize said delay line as an integrating means during a second portion of the cycle.

Figure 2:
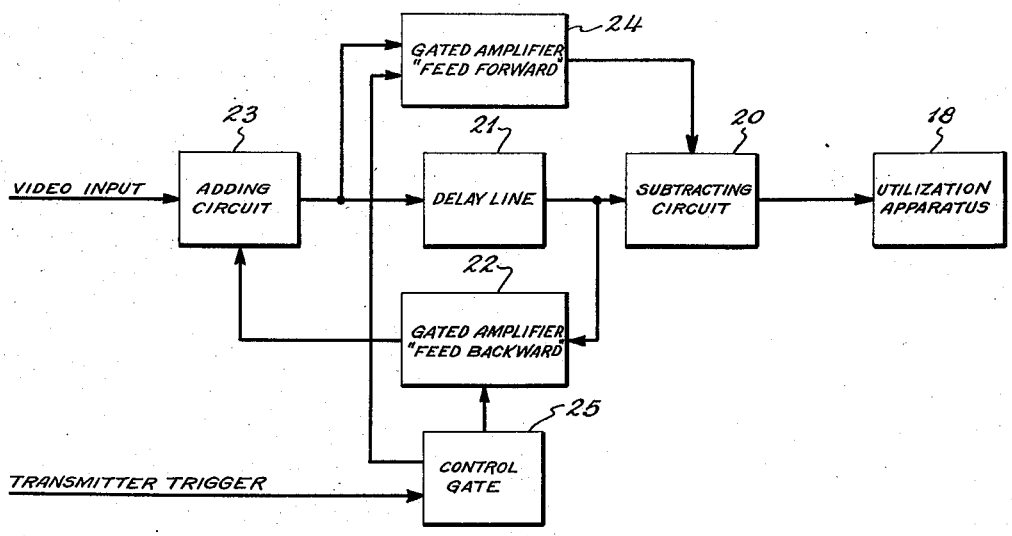
Figure 3:
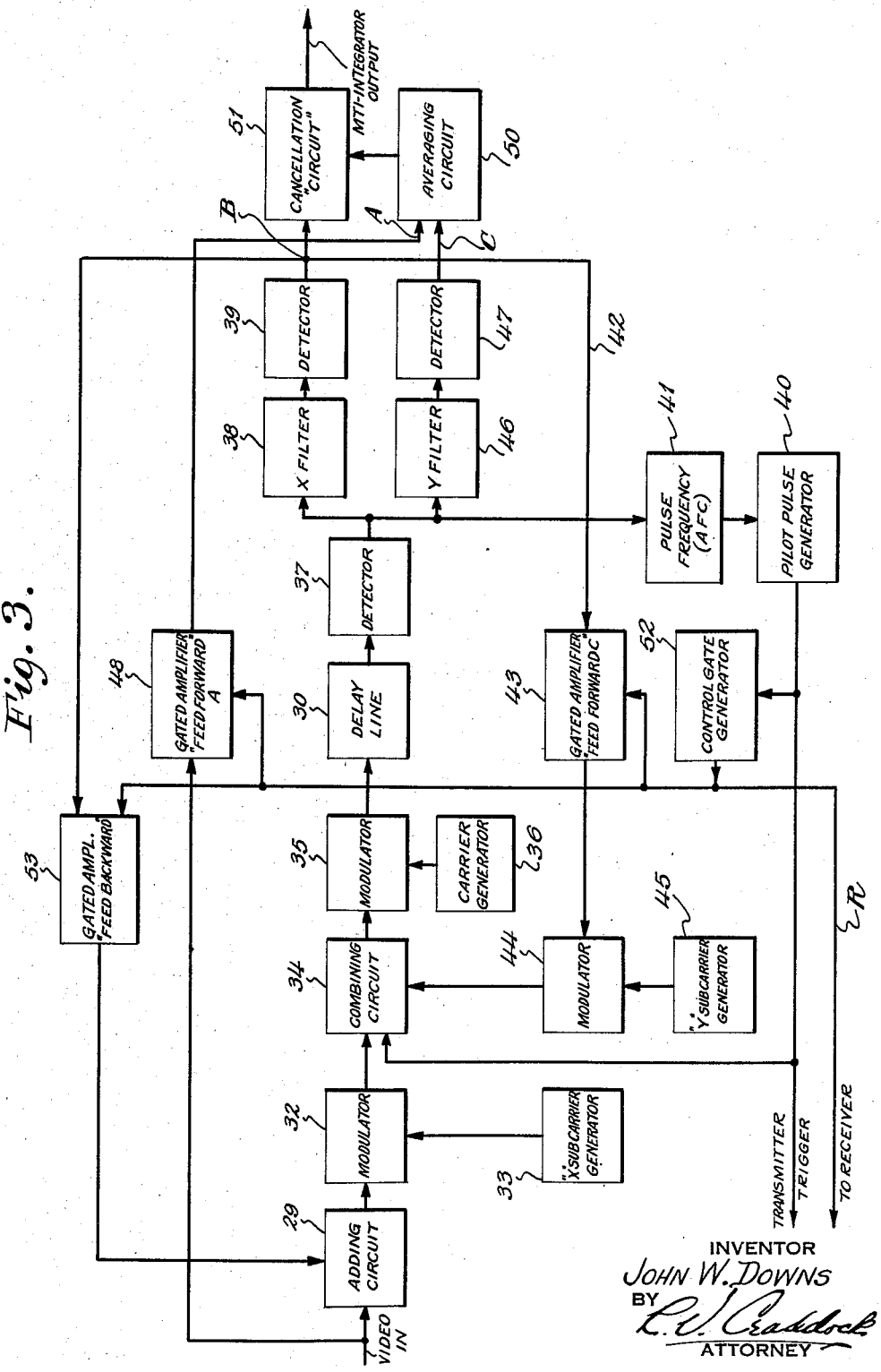
Figure 4:
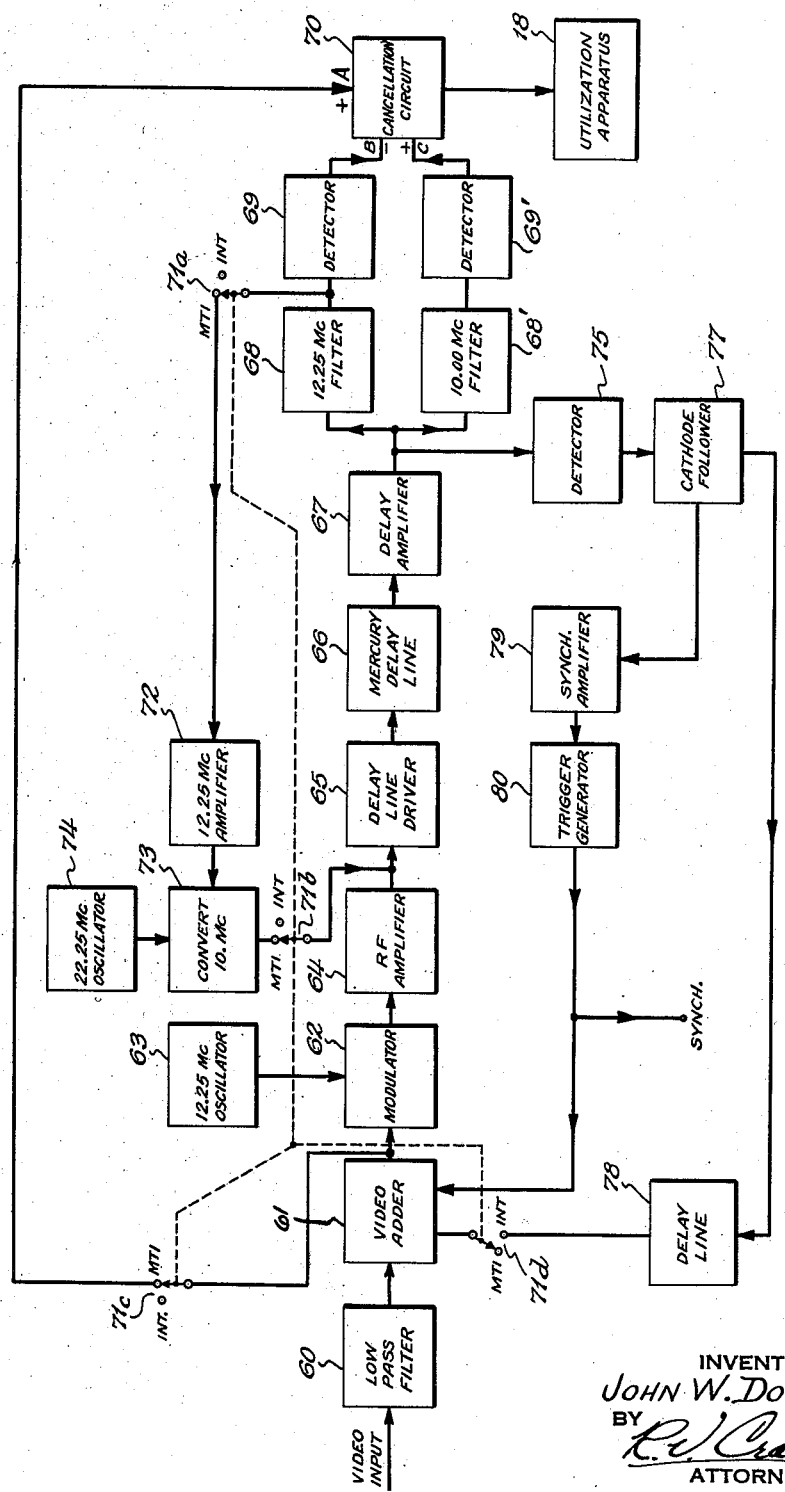
Figure 5:
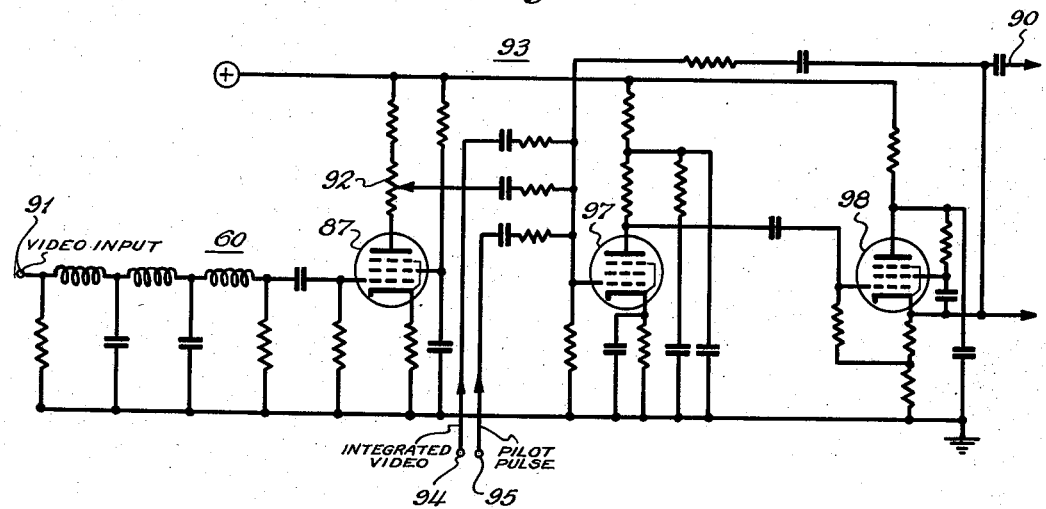
Figure 6:
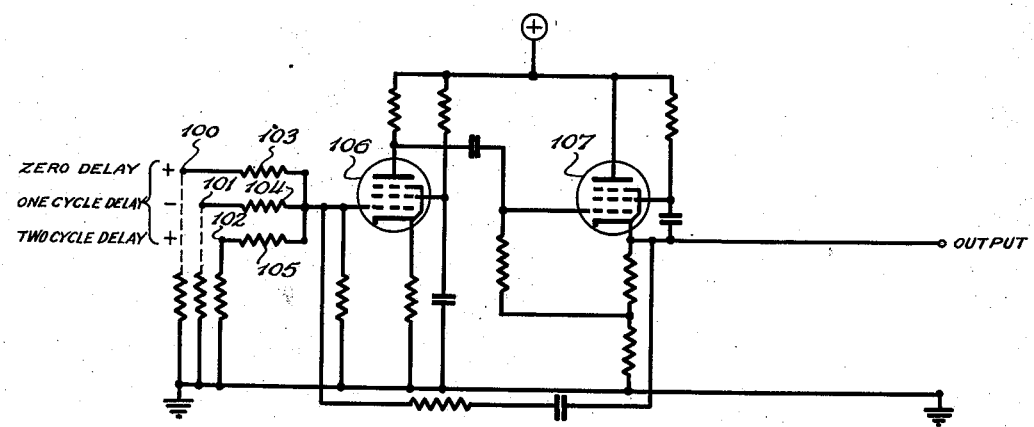

These and other objects of the invention will be apparent from the following specification and figures, of which, Fig. 1 is a block diagram of a three-pulse comparison M. T. I. system, Fig. 2 is a simplified block diagram of a combined M. T. I. integrating system embodiment of the present invention, Fig. 3 is a block diagram of a combined M. T. I. integrating system embodiment of the present invention, Fig. 4 is a block diagram of another embodiment of the invention, Fig. 5 is a schematic diagram of addition circuits suitable for use in the invention, and Fig. 6 is a schematic diagram of cancellation circuits suitable for use in the invention.

Figs. 7a–7d are diagrams illustrative of the theory of the invention.

A feature of the present system is the improvement in rejection obtained by comparing three pulses instead of the conventional two. The delay line method is used to do this. In addition to cancelling the ground targets, the delay line of the present system is used as an integrating circuit during approximately the last two-thirds of the search sweep. Thus, several advantages can be gained with the use of a minimum amount of additional equipment.

Another feature of this system is the comparison of three echo pulses instead of the conventional two. The soundness of this principle may be arrived at as follows.

The amplitude of the video pulse is determined by both the amplitude and radio frequency phase of the received pulse signal. Since the transmission path length remains constant for fixed targets, the phase is constant and the video pulse varies in accordance with the pulse amplitude only. Moving targets cause the phase to change at a rate which causes the video pulse to have a distribution in amplitude, which depends on the radar frequency and pulse rate as well as the target velocity. Therefore, a means of discriminating between fixed and moving targets is provided.

In a two-pulse comparison system the cancellation circuit has a residual output from fixed targets equal to the difference of the two pulses being compared. It may be pointed out that the adjacent pulses could be made more nearly equal by increasing the pulse repetition rate or by scanning at a slower rate. This results in a larger number of hits-per-target, which is known to give better discrimination against fixed targets. An equivalent statement might be that better fixed-target rejection can be obtained by making more comparisons and may be arrived at heuristically as follows.

The simplified cancellation circuits C, D of Fig. 7a may be considered a linear filter which has the transmission characteristic of the solid curve in Fig. 7b. This curve has a sinusoidal shape since the cancellation or subtraction of pure sinusoidal signals is being considered, which are phase shifted with respect to each other by the time delay D. It is well known that linear filters may be cascaded, thereby improving the over-all selectivity. For instance, two cascaded filters of the example in Fig. 7a would have the characteristic shown in dotted lines in Fig. 7b. At $f_a$, for example, a single filter would have 3 db of attenuation (relative to the maximum) while the two sections would have 6 db. Further cascading will provide more selective response.

It is well known that a pulse type signal encountered in radar systems, such as that to which this equipment is preferably appended, may be represented or resolved into fundamental sinusoidal components. As for example, see page 22, Radio Engineering Handbook, F. E. Terman, McGraw-Hill Publishing Co., where the harmonic composition of a short square pulse type signal is expressed as $$Y = E\left\{k - \frac{2}{\pi}(\sin k_\pi \cos x + \tfrac{1}{2} \sin 2k_\pi \cos 2x + \tfrac{1}{3} \sin 3k_\pi \cos 3x \ldots \frac{1}{n} \sin nk_\pi \cos nx)\right\}$$

Fig. 7c is a graph of this function with the nomenclature changed to apply to this invention. The components of the signal are harmonics of the radar pulse repetition frequency (P. R. F.). Due to the azimuthal scan of the radar, a finite number of pulses are received from an isolated target such as illustrated in Fig. 7d. Because of this, each harmonic of the P. R. F. has additional sidebands generated symmetrically around it as illustrated at "P. R. F." in Fig. 7c.

The "width" of these "scanning sidebands" is determined by the scan speed of the radar and also to the number of echoes received per target (N). As the scan speed is increased, N is proportionally decreased, resulting in a wider clutter spectrum.

Now it will be immediately recognized that signals having the complex spectra described will not be completely rejected by the filter of Fig. 7a. However, the broadening of the rejection bands of the three pulse comparison system provides more rejection. Another way of stating this is to say that the three pulse system is better matched to the signals encountered.

The present system compares one pulse with the average of the two adjacent pulses, the preceding pulse and following pulse. For instance, a second pulse will be compared to the average of first and third pulses. The third pulse will be compared to the average of second and fourth pulses, etc. The actual improvement over a two-pulse comparison system can be shown. A radar system utilizing 20 hits-per-target and comparing two pulses can be expected to have a ground target rejection of 25 db. On the other hand, comparison of three pulses results in a 43 db rejection.

A simplified block diagram illustrating the three-pulse comparison system is shown in Fig. 1 which shows a conventional radar system 1 comprising transmitter 2, receiver 3, local oscillator 4 and mixer 5. The output of receiver 3 is a video signal which is connected to the three-pulse M. T. I. system of the present invention. The video is connected to modulator 6 where it is modulated on the output of oscillator 7. The output of the modulator 6 is applied to three separate channels which provide undelayed, one cycle delayed, and two cycle delayed signals, the delays being equal to one or two cycles of the radar pulse repetition frequency. The undelayed signal is produced by the detector 8. The one cycle delayed signal is produced by the delay circuit 10, amplifier 11 and detector 12. The two cycle delayed signal is produced by the double delay circuit 13, amplifier 14 and detector 15. The outputs of the detectors 8 and 15, and namely the undelayed and two cycle delayed signals, are averaged in averaging circuit 16. The output of averaging circuit 16 and the one cycle delayed output from detector 12 are connected to cancellation circuit 17 where the one cycle delayed signal is compared with the average of the preceding and succeeding signals. The output of the cancellation circuit 17 is the desired M. T. I. output which may be connected to suitable indicating or utilization apparatus 18.

Due to the curvature of the earth, ground targets are not intercepted by the radar beam at ranges beyond approximately 75 miles. However, in order to provide M. T. I., the long-range search system requires a delay equal to the entire range sweep, which is in the order of 2500 microseconds, even though ground targets can appear only in approximately the first 900 microseconds of the sweep. It is proposed to use the same delay line as an integrator during the last two-thirds of the sweep, and thereby increase the probability of detection at maximum ranges.

A block diagram illustrating the basic combined M. T. I. integrator circuits is shown in Fig. 2. For simplicity of illustration, a two-pulse M. T. I. system is shown in this diagram, the undelayed signal being fed forward via amplifier 24.

Integration is achieved by taking the delayed signal pulse from delay line 21, feeding it back via gated amplifier 22 and adding it to the input video pulse from the succeeding range sweep in adding circuit 23. The gain of the feedback loop is adjusted to give integration over the proper number of pulses depending on the number of hits-per-target.

In order to separate the M. T. I. and the integrating actions, the "feed-forward" and "feed-backward" amplifiers 24 and 22 are gated on alternately by control gate generator 25 with the "feed-forward" amplifier 24 gated on during the first or M. T. I. portion of the range sweep, and the "feed-backward" amplifier 22 gated on during the remainder or integrating portion. The control gate generator 25 is triggered by the radar 1 transmitter. The M. T. I. portion operates by subtracting delayed and undelayed signals in subtracting circuit 20. The undelayed signals are applied thereto via gated amplifier 24, and the delayed signals via delay line 21.

From a practical standpoint a delay line has several advantages over a storage tube.

(1) The delay line is a continuously integrating circuit in contrast to the type which "reads" the stored information only at specified intervals. Since there can be no correlation of the "reading" period with the sweeps during which echoes are received, this represents an important advantage.

(2) The circuits are less complicated, more stable, and easier to adjust and maintain.

(3) Very little additional equipment is needed to obtain delay-line integration if the delay line is already included in the system for M. T. I. purposes.

It is recognized that a cathode ray tube, when used as an indicator, is also an integrator. It is possible, however, that the tactical use of the radar system might require automatic identification of targets, which make the indicator output useless. A threshold circuit connected to the output of the delay-line integrator would form a means of identifying a target whenever the integrated pulses exceeded a preset level relative to the noise background.

The relative efficiency of integration between the delay line and other type of integrators has been studied. It is known that the same law of addition (of pulses) applies to (1) narrow-band LC filters, (2) RC networks, (3) the barrier grid storage tube and (4) the regenerative delay line proposed here. In these circuits the pulses are added linearly with an exponential weighting. A cathode ray tube adds pulses on a $\sqrt{N}$ law where N is the number of pulses integrated. In most applications the linear integrator would be preferred.

A system combining three-pulse M. T. I. and integration is shown in Fig. 3. One of the delay lines shown in Fig. 1 has been eliminated by causing the video to pass through a single delay line 30 twice during the M. T. I. mode of operation. It is, therefore, not necessary to equalize the delay of two lines, or to compensate the one delay line used, since the repetition period of the radar is controlled by the delay line. Also the radar transmitter trigger may be obtained from a pilot pulse generator 40 whose pulse frequency is controlled by circulating pulses through the delay line and an automatic pulse repetition frequency control circuit 41.

The delay line 30 is preferably of the supersonic type, using mercury as the transmitting medium. A high-frequency carrier signal from generator 36 is modulated by two sub-carriers. Referring to the block diagram, it can be seen that target echoes are presented at point A with no delay, and at points B and C with delays of one and two repetition periods respectively. Pulses A and C are then averaged, and pulse B is compared to this average. The output is therefore equal to the difference between one pulse and the average of the preceding pulse and the succeeding pulse.

Gated amplifiers are placed in the "feed-forward" and the "feed-backward" lines. The "feed-backward" circuit is energized during the integrating portion of each sweep while the "feed-forward" circuits are energized during the M. T. I. portion. No signals are present at points A and C during the integrating period, and the output (point B) is derived only from the signals being continually circulated on the X sub-carrier through the "feed-backward" gated amplifier. The "feed-backward" loop gain is adjusted to less than unity to give integration over the proper number of pulses, depending on the number of hits-per-target available from the particular radar set.

More specifically, the video input is connected through adding circuit 29 to modulator 32 where it is impressed on a sub-carrier X received from generator 33. The sub-carrier X passes through combining circuit 34 and is modulated in modulator 35 on the carrier from carrier generator 36. The signal is then passed through the delay line 30, detector 37, X bandpass filter 38, and detector 39. Thus, the signal at point B is delayed one cycle by delay line 30.

The output of detector 39 is connected via lead 42 through gated amplifier 43 to modulator 44 where it is modulated on sub-carrier Y provided by Y generator 45. The Y modulated signal is then recirculated through combining circuit 34, modulator 35, delay line 30, detector 37 to Y filter 46 and detector 47, thus providing at point C a signal twice delayed.

Undelayed video is also connected through gated amplifier 48 directly to the averaging circuit 50. Therefore, the two inputs to averaging circuit 50 are undelayed signals at point A and twice delayed signals at point C. These are the signals preceding and succeeding the signal at point B which has been once delayed. The average output of averaging circuit 50 and the once delayed signal of point B are connected to cancellation circuit 51 which provides the desired M. T. I. output.

The control gate generator 52 which may be a multivibrator is energized by the pilot pulse generator 40 and gates on the "feed-forward" gated amplifiers 43 and 48 during the first or M. T. I. portion of the cycle.

The integration mode of operation, during the latter portion of the pulse cycle, is provided by gating off the "feed-forward" amplifiers 43 and 48, and gating on the "feed-backward" amplifier 53. The feedback integration gated amplifier 53 connects a delayed signal from point B at the output of detector 39, to the adding circuit 29 where delayed and undelayed signals are added to provide the desired integration. The receiver local oscillator (not shown) may be gated by the output of control gate generator 52 via lead R if desired.

The pilot pulse from generator 40 is circulated via circuits 34, 35, delay line 30, detector 37 and automatic frequency control circuit 41 back to pilot pulse generator 40 to thereby control the pulse frequency. Suitable addition, averaging and cancellation circuits are shown in Figs. 5 and 6. All other circuits are conventional.

Fig. 4 shows another embodiment of the invention wherein the video input is connected to the lowpass filter 60 and then passes through the video adding circuit 61 and then to the modulator 62 where it is modulated on a 12.25 megacycle carrier from oscillator 63. The signal then passes through R. F. amplifier 64 and delay line driver stage 65, then through the delay line 66 and post delay amplifier 67. The 12.25 mc. signal then passes through the 12.25 mc. filter 68, detector 69 to the cancellation circuit 70. The once delayed 12.25 mc. signal B is arranged to have opposite polarity to the other two inputs to cancellation circuit 70, since it is to be subtracted from the average of the other two.

A portion of the output from the filter 68 is connected through the switch 71a and amplifier 72 to the frequency converter 73. The inputs to the frequency converter are 12.25 megacycles from amplifier 72 and 22.25 megacycles from oscillator 74. The output of the converter is, therefore 10 megacycles which is connected through the switch 71b to the amplifier driver 65 where the 10 mc. signal is then recirculated through delay line 66, post delay amplifier 67, 10 mc. filter 68', and detector 69' to provide a twice delayed signal C to the cancellation circuit 70. An undelayed signal A is also provided from low pass filter 60 through switch 71c to cancellation circuit 70.

In the integration mode of operation, the ganged switches 71a, etc., are turned to the integration position and the signal is taken from post delay amplifier 67 through detector 75, cathode follower 77, delay line 78, and switch 71d to the video addition circuit 61. The purpose of the delay line 78 is to compensate for phase shifts or delay inherent in the system.

Single side band modulation is preferable to limit the bandwidth required of the delay line. The ganged switch 71 may be replaced by gated amplifiers as in Fig. 3.

Pulse frequency is controlled by the delay line 66. A trigger from generator 80 is circulated via circuits 61, 62, 64, 65, delay line 66, amplifier 67, detector 75, cathode follower 77, synchronizer amplifier 79 back to trigger generator 80. The trigger output from generator 80 may also be used for an external trigger to the associated radar system.

Significant features of the embodiment of Fig. 4 are as follows:

(1) The use of single sideband transmission of the R. F. signals through the delay line.

(2) The addition of a low pass filter at the input.

(3) Use of a "frequency-conversion" to the second carrier rather than detection and remodulation.

(4) Integration video is fed back from the wide band post-delay amplifier rather than the narrow band channel separating filter.

(5) Combination of the "averaging" and "cancellation" circuits into a single cancellation unit.

Single sideband transmission is preferable due to the available bandwidth of the mercury delay line and the nature of the signals to be operated on. A typical radar, with which the present M. T. I. invention may be used, employs a 4 microsecond pulse in performing the 200 mile search function. Assuming a reasonable rise time (25% of the pulse width) a minimum video pass band of approximately 150 kc. or an I. F. bandwidth of 300 kc. will be required. Now if a single carrier were used, modulated with two sub-carriers, there would be four principal sidebands in the frequency spectrum. Each of these sidebands would be further modulated by the video and have sub-sidebands extending ± 150 kc. about the sub-carrier. A total bandwidth of 6 mc. would be required to provide enough frequency separation to avoid cross-talk. Single sideband transmission only requires one-half this bandwidth and is within the limits of the delay line.

The low pass filter was found necessary to limit the modulation sidebands to the assigned channel boundaries, thereby preventing cross-talk, in event of a sharper than predicted pulse being used. Of course, this limits the resolution of the over-all system to that of a 4 microsecond pulse radar. In the event the use of a shorter pulse becomes desirable, the bandwidths involved will have to be completely revised.

The frequency conversion avoids the loss in signal-to-noise ration ($S/N$) that results in passing signal and noise through non-linear circuit elements such as the detector.

It was found desirable to feed back the video to be integrated from the wide band amplifier rather than from a channel filter to avoid excessive distortion of the pulses. The channel filter transmission characteristic would be regenerated by the feedback; therefore, the individual channel bandwidth would have been narrowed excessively if the feedback were derived from the output of a channel filter.

The principal problem encountered in using two data channels through a common delay line is cross-talk. Isolation between the channels may be shown to depend on (1) the width of modulation on each carrier, (2) the linearity of the components common to both signals and (3) selectivity of the individual channels.

The frequency width associated with the signal has been limited by a low pass filter at the input to this proposed equipment. A cut-off frequency of 0.5 mc. has been satisfactorily used in conjunction with 1 mc. wide R. F. channels.

The linearity problem has not been troublesome except in attaining good cancellation over the expected range in ground clutter. The use of balanced modulators is perferable to keep the cross-talk from this source to a negligible value.

When the over-all system is properly adjusted, the cross-talk is below the noise level and therefore negligible. Cross-talk resulting from a pulsed input is also below the noise level. If the input to the first channel is not fed back into the second channel, it is impossible to detect the presence of the pulse in the second channel output.

Fig. 5 shows a schematic diagram of the circuits of filter 60 and adder 61, Fig. 4, which comprises a low pass filter, a video amplifier, and a video addition circuit. The video input is received on terminal 91, passes through the low pass filter 60 and amplifier 87 through level adjusting potentiometer 92 to the addition network 93. The other inputs to the addition network 93 may be the integrator video on terminal 94 and pilot pulse on terminal 95. The video signals are added and applied to the grid of the amplifier tube 97 from which they are passed through the cathode follower output stage 98. An undelayed signal is fed forward on the lead 90 to the cancellation amplifier 70, Fig. 4. The output of the cathode follower is connected to the modulator 62, Fig. 4.

Fig. 6 shows a schematic diagram of an embodiment of the cancellation and averaging circuits which comprises generally a resistance summing network and a high gain feedback amplifier. The feedback amplifier reduces the impedance of the resistance network to a very low value. This prevents interference between the three channel inputs under varying signal level conditions.

The zero delay signal is applied to the terminal 100. The one cycle delay signal is applied to the terminal 101, and the two cycle delay is applied to the terminal 102. The one cycle delay output is connected in the reversed polarity from its channel filter, since it is to be subtracted from the average of the other two signals. The values of the resistors 103, 104, 105 may be chosen in the relation 1:2:1 respectively for proper weighting of the signals relative to each other. The feedback amplifier comprises two stages, namely amplifiers 106 and 107. The output of the cancellation circuit is taken from the cathode circuit of tube 107.

To conclude, echoes from targets beyond the ground clutter region will be enhanced in reference to the noise background by using the delay line as an integrator. The efficiency of this type of integrator will approach that of an "ideal" integrator and will be superior to that of a plan position indicator. A continuously integrating device of this type produces an output during each range sweep. The number of hits-per-target is thus unaffected and the azimuth position of the target may be determined to within a fraction of an antenna beamwidth. This is in contrast to the storage-tube integrator from which stored data is "read" only once during each beamwidth in the scanning cycle. In that case, because only a single integrated pulse is available for each beamwidth, the accuracy of the azimuth data is limited to plus or minus one beamwidth. A more distinct advantage of the continuously integrating device is that a target is never "missed" due to the finite number of returned pulses being divided into two "integrating" periods with the resulting loss in signal during the two "reading" cycles.

Compared to a narrow-band filter, the delay line integrator has the advantage of covering all range elements. When a narrow-band filter is used to improve the signal-to-noise ratio (in the video), a range gate is required to separate the data of interest, and only one element of range may be covered by single gate and filter. A 200 mile search system with a resolution of one mile would require 200 range gates and 200 filters. The problem of having an echo divided between two range elements is comparable to the azimuth division in the storage-tube integrator.

Features of the present invention are:
(1) The rejection of ground clutter is greatly improved.
(2) No major modifications to a radar system are necessary as would probably be required in a system based on double-pulsing the transmitter.
(3) M. T. I. performance will be improved over the regions where ground targets are encountered, and detection performance will be improved over the remainder of the range sweep by integration.

Therefore, it is seen that the combined M. T. I. and integrator system of the invention is an equipment for improving the sub-clutter visibility of search radars which employ few hits-per-target. The principle of operation is based on the comparison of the amplitudes of three successive pulses received from the same target, rather than the two-pulse comparison of conventional M. T. I. equipments. Comparison of three pulses is accomplished by recirculating the video signal through the delay line on a second carrier. This makes the video of three range sweeps (with delays of 0, T and 2T) available for analysis.

The embodiment illustrated is meant to be used with radars having a useful range in the order of 200 miles. Ground clutter presents a visibility problem over an average of 35% of this range. Since the delay (line) is required to equal the sweep period in length, the delay line is also used for integrating the desired signals received on the last 65% of the sweep during which no clutter exists.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a pulse radar system having a certain pulse repetition frequency, means to receive reflected signals, moving target detector means connected to said receiving means comprising means to delay said signals at least one cycle of said repetition frequency, subtracting means adapted to be connected to said receiving means and said delay means to subtract delayed and undelayed versions of said received signals, and addition means adapted to be connected to said receiving means and said delay means to integrate delayed and undelayed versions of said received signals.

2. In a pulse radar system having a certain pulse repetition frequency, means to receive reflected signals, moving target indicator means connected to said receiving means comprising means to delay said signals at least one cycle of said repetition frequency, subtracting means connected to said receiving means and said delay means to subtract delayed and undelayed versions of said received signals, addition means connected to said receiving means and said delay means to integrate delayed and undelayed versions of said received signals, and time sharing means connected to said addition and subtraction means to cause said subtraction means to operate during a first portion of said pulse cycle and to cause said addition means to operate during a second portion of said pulse cycle.

3. Moving target indicator radar means having a certain pulse repetition interval comprising means to receive reflected signals, means connected to said receiving means to cancel signals received from stationary targets, integrating means connected to said receiving means to integrate received signals, and time sharing gating means connected to operate said cancellation means during the first portion of said pulse repetition interval and said integration means during the second portion of said pulse repetition interval.

4. In a moving target indicator radar system comprising receiving means, means connected to said receiving means to cancel signals from fixed targets, means connected to said receiving means to integrate received signals, and time sharing means connected to alternately operate said cancellation and said integration means.

5. In a pulse radar system having a certain pulse repetition frequency, means to receive reflected signals, moving target indicator means conected to said receiving means compirsing first means to delay successive signals one cycle and two cycles of said repeition frequency, means connected to said receiving means and said delay means to average two-cycle delayed and undelayed versions of said received signals, cancellation means connected to said averaging means to combine said one-cycle delayed and said averaged versions of said received signals.

6. In a pulse radar system having a certain pulse repetition frequency, means to receive reflected signals, moving target indicator means connected to said receiving means comprising means to delay said signals one and two cycles of said repetition frequency, averaging means connected to said receiving means and said delay means to subtract two-cycle delayed and undelayed versions of said received signals, subtraction means connected to said delay means and said averaging means to cancel said one-cycle delayed and said averaged versions of said received signals to integrate them, and time sharing means connected to said averaging and subtraction means to cause said subtraction means to operate during one portion of said pulse cycle and to cause said averaging means to operate during another portion of said pulse cycle.

7. In a receiving system adapted to receive signals of a known repetition rate, means to receive said signals, means connected to said receiving means to delay said signals one cycle and two cycles of said repetition rate, means connected to said receiving means to average said undelayed received signals and said two cycle delayed signals, and means connected to said averaging means to compare said averaged and said one cycle delay signals.

8. In a receiving system adapted to receive signals of a known repetition rate, means to receive said signals, a delay line connected to said receiving means to delay said signals one cycle of said repetition rate, means connected to said delay line to recirculate signals through said delay line to delay said signals two cycles, means connected to said receiving means in said two cycle delay means to average said undelayed received signals and said two cycle delayed signals, and means connected to said averaging means and said one cycle delay means to compare said averaged and said one cycle delayed signals.

9. Means to receive signals having a predetermined repetition rate, comparative means including a delay line and means to recirculate signals through said delay line connected to said receiving means to compare a received signal with the average of the preceding and succeeding signals received and utilization apparatus connected to said comparative means.

10. In a pulse radar system signal receiving means, signal delay means, first means connected to said delay means and said receiving means to cancel successive signals from fixed targets, second means connected to said delay means and said receiving means to integrate successive received signals, and utilization means connected to said first means.

11. In a pulse radar system, signal receiving means, signal delay means, means to connect said delay means to said receiving means so as to cancel successive signals from fixed targets during one portion of the pulse cycle, and means to connect said delay means to said receiving means to integrate successive received signals during the remaining portion of said cycle.

12. In a pulse radar system, a source of received video signals, delay means connected to said video source adapted to delay said video signals one full pulse cycle, means to control said delay means to cancel successive received signals from fixed targets during one portion of the pulse cycle and to add successive received signals during the remaining portion of the cycle.

13. In a pulse radar system, means for comparing successive signals of target return energy comprising, means to delay a target signal for two pulse repetition periods, means to delay the next sucessive signal from said target for one pulse repetition period, and means for combining said delayed pulses with the next successive signal from said target whereby to detect moving targets.

14. In a pulse radar system, means for comparing successive signals of target return energy comprising, means to delay a target signal for two pulse repetition periods, means to delay the next successive signal from said target for one pulse repetition period, means for averaging said twice delayed signal with the next successive signal from said target, and means for comparing said averaged signal with said once delayed signal whereby the difference therebetween provides moving target detection.

15. In a pulse radar system, means for comparing successive signals of target return energy comprising, means to delay a target signal for one pulse repetition period, means to recirculate said delayed target signal through said delay means whereby said target signal is delayed for two pulse repetition periods, means for passing the next successive signal from said target through said delay means, and means for combining said delayed pulses with the next successive signal from said target whereby to detect moving targets.

16. In a pulse radar system, means for comparing successive signals of target return energy comprising, means for modulating a first frequency with a target signal, means to delay said modulated first frequency for one pulse repetition period, means to detect said once delayed target signal, means to modulate a second frequency with said delayed target signal, means to recirculate said modulated second frequency through said delay means, means to detect said twice delayed signal, and means for combining said delayed signals with the next successive signal from said target whereby to detect moving targets.

17. In a pulse radar system, means for comparing successive signals of target return energy comprising, means for modulating a first frequency with a target signal, means to delay said modulated first frequency for one pulse repetition period, means to convert said once delayed target signal to a second frequency, means to recirculate said modulated second frequency through said delay means, means to detect said once delayed target signal, means to detect said twice delayed signal, and means for combining said delayed signals with the next successive signal whereby to detect moving targets.

18. Means to receive signals having a predetermined repetition rate, said signals comprising at least one signal, a preceding signal and a succeeding signal, means to average said preceding and succeeding signals and means connected to said receiving means and said averaging means to compare said one signal with said average of said preceding and succeeding signals.

References Cited in the file of this patent

UNITED STATES PATENTS

| | | |
|---|---|---|
| 2,479,568 | Hansen | Aug. 23, 1949 |
| 2,487,995 | Tucker | Nov. 15, 1949 |
| 2,532,546 | Forbes | Dec. 5, 1950 |
| 2,597,636 | Hall et al. | May 20, 1952 |
| 2,600,255 | McConnell | June 10, 1952 |
| 2,659,079 | Cunningham | Nov. 10, 1953 |